US005573630A

United States Patent [19]

Edney et al.

[11] Patent Number: 5,573,630

[45] Date of Patent: Nov. 12, 1996

[54] WALLPAPER APPLICATOR

[75] Inventors: Judy L. Edney; Dennis J. Edney; Clayton Cottrell; Louise Cottrell, all of Morgantown, N.C.

[73] Assignee: Shur-Line Inc., Lancaster, N.Y.

[21] Appl. No.: 515,375

[22] Filed: Aug. 15, 1995

[51] Int. Cl.[6] ........ B32B 31/00

[52] U.S. Cl. ........ 156/577; 156/523; 156/579

[58] Field of Search ........ 156/523, 524, 156/574, 575, 577, 579

[56] References Cited

U.S. PATENT DOCUMENTS

| | | | |
|---|---|---|---|
| 1,901,908 | 3/1933 | Hoyos | 156/577 X |
| 5,280,869 | 1/1994 | Ricci | 248/309.2 |
| 5,328,543 | 7/1994 | Campagna | 156/579 X |
| 5,403,430 | 4/1995 | Araujo et al. | 156/579 X |
| 5,453,152 | 9/1995 | Mazzola et al. | 156/579 X |

*Primary Examiner*—James Engel

*Attorney, Agent, or Firm*—Phillips, Lytle, Hitchcock, Blaine & Huber

[57] ABSTRACT

An improved wallpaper applicator (10) includes a shaft (11); a cup-shaped member (12) mounted on the shaft and having a reservoir (33); a spindle (13) also mounted on shaft (11) and having a tubular portion (35) and a flange portion (36); and a resilient ring (14) mounted on the shaft below the cup-shaped member. A wallpaper border roll (53) is mounted on the flange portion and is wrapped about the tubular portion. An end of the roll (54) is inserted through a slit (46) in the tubular portion. As more wallpaper is desired from the roll, spindle (13) freely rotates about shaft releasing wallpaper.

9 Claims, 2 Drawing Sheets

WALLPAPER APPLICATOR

TECHNICAL FIELD

The present invention relates generally to wallpaper applicators, and, more particularly, to an improved applicator for wallpaper borders.

BACKGROUND ART

The use of wallpaper borders has become popular in recent years. Wallpaper border adds an inexpensive decorative accent to a room and can be applied by the home owner.

Two common problems faced are applying the wallpaper border high on a wall and applying an entire roll continuously. Wallpaper borders are normally applied horizontally on a wall where it meets the ceiling. Accordingly, the wallpaper border roll must be supported near the ceiling to facilitate its application. One way to circumvent this application difficulty is to apply the wallpaper border in sheet sections. However, this can lead to unsightly seams where the sections abut or overlap.

Others, including U.S. Pat. No. 5,328,543 to Campagna, and a border applicator sold under the trademark BORDER-MATE sold by Paint Sundry Products, Inc. of Mississauga, Ontario, Canada, have attempted to address these problems. The U.S. Pat. No. '543 patent discloses a pole-and-canister system for applying wallpaper borders. A cup-shaped canister having a lid is mounted near the tip of a shaft. The shaft extends into the canister. A longitudinal slit is provided in the wall of the canister from the canister top to the lower marginal end of the canister. A roll of wallpaper border rests inside the canister around the portion of the shaft extending into the canister. The wallpaper is played out through the slit. This device allows one person to apply a wallpaper border by propping the device against a wall and dispensing wallpaper as needed by moving the device in the direction the border is being applied.

However, the device of the U.S. Pat. No. '543 patent has short comings. First, many wallpaper borders have an adhesive pre-applied to their backs. The adhesive is activated by contact with water, forming a paste. Using the device disclosed in the U.S. Pat. No. '543 patent, excess water or paste can collect in the base of the canister until it reaches the level of the bottom of the slit. Any additional excess water or paste will then flow out of the canister. Further, as the device of the U.S. Pat. No. '543 patent applies the end of the wallpaper border roll, it is possible that the end may unwind from the shaft and spring through the slit, again causing water or paste to leak from the canister.

Paint Sundry Products, Inc. sells a wallpaper border applicator under the trademark BORDERMATE. Similar to the device described in the U.S. Pat. No. '543 patent, the BorderMate uses a canister mounted on a shaft. However, the provided slit in the BorderMate canister does not extend the entire length of the canister wall. In addition, the wallpaper border rests on an annular flange which is adjustably mounted on the shaft. When the flange is adjusted correctly, the bottom of the wallpaper border rests on the shaft at the level of the bottom of the slit. Accordingly, the portion of the canister below the slit acts as a reservoir for any water or paste. However, the end of the wallpaper border can still unwind from the shaft and spring through the slit, potentially causing excess water or paste to leak from the canister.

The present invention broadly provides an applicator for a wallpaper border roll having a reservoir for excess water and paste, and a journaled spindle to which the wallpaper is attached by passing an end of the wallpaper through a slit on the spindle.

DISCLOSURE OF THE INVENTION

The present invention broadly provides an improved wallpaper applicator which is particularly suited for use in aplying wallpaper borders. However, it should be clearly understood that this particular application is illustrative, and is not limitive of the scope of the appended claims.

With parenthetical reference to the corresponding parts, portions or surfaces of the disclosed embodiment, merely for purposes of illustration, and not by way of limitation, the improved applicator (10) broadly includes a shaft (11); a cup-shaped member (12) mounted on the shaft; a spindle (13) journaled on the shaft, the spindle having a tubular portion (35) and having a flange portion (36); and abutment means (14) which prevents the movement of the cup-shaped member in one direction along the shaft.

A wallpaper border roll (53) is wrapped about the tubular portion of the spindle. One face of the wallpaper is decorative, while the other may have a dry adhesive activated by water. The roll is soaked in water prior to its wrapping about the tubular portion. The result is a paste coating on the non-decorative face of the wallpaper. One end (54) of the roll is passed through a slit (46) in the tubular portion, and thus the end is positioned within the tubular portion. This prevents the wallpaper border from unwinding from the spindle. A plurality of openings between the upper and lower surfaces of the flange portion of the spindle allow excess water or paste to drip from the roll into a reservoir (33) defined by the cup-shaped member.

In one embodiment, the reservoir has an absorbent pad (55) which slows excess water or paste from collecting in one portion of the cup-shaped member.

Accordingly, the general object of this invention is to provide an improved applicator for applying wallpaper to a surface.

Still another object is to provide an improved wallpaper applicator which prevents excess water or paste from leaking out of the applicator.

These and other objects and advantages will become apparent from the foregoing and ongoing written specification, the drawings, and the appended claims.

DESCRIPTION OF THE PREFERRED EMBODIMENTS

Figure 1:
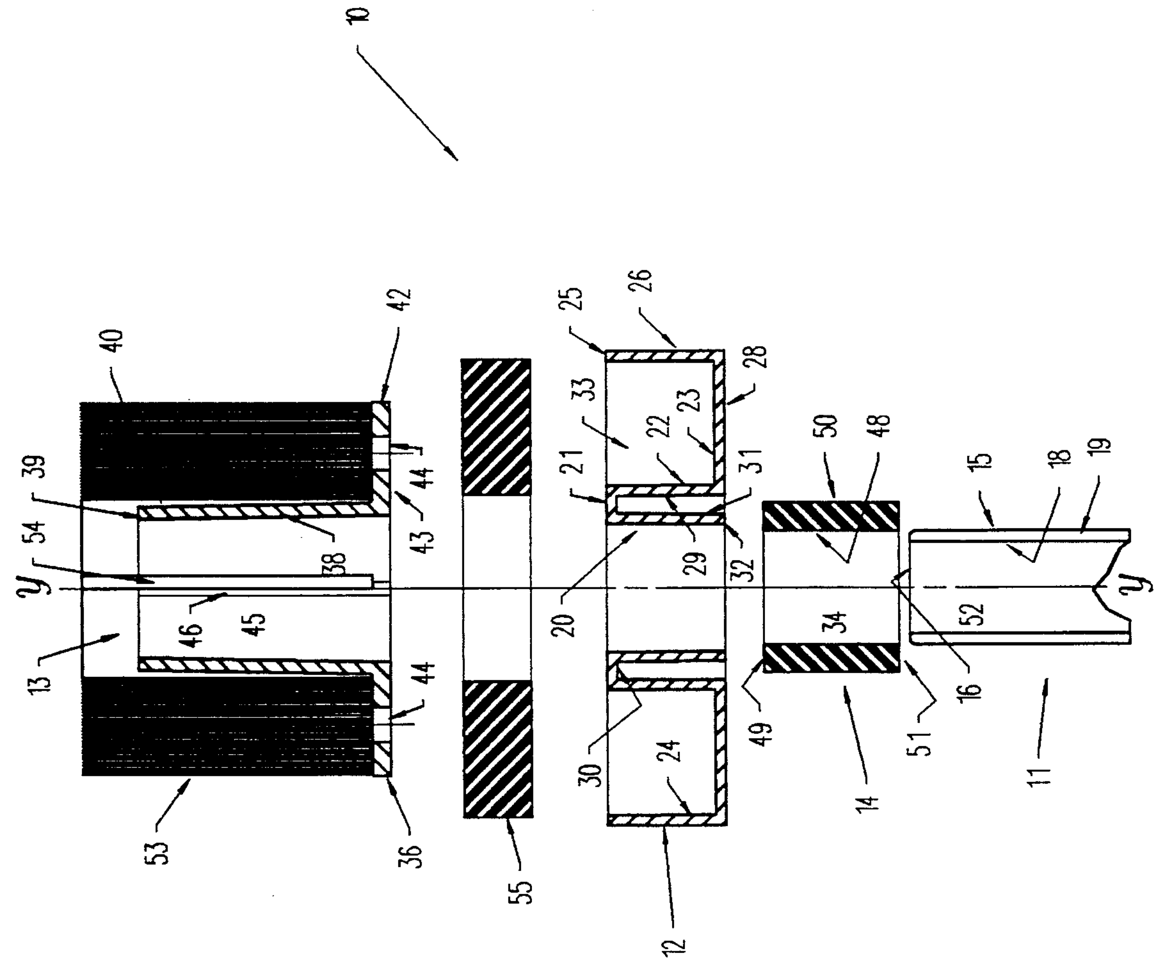
FIG. 1 is an exploded vertical sectional view of the improved wallpaper applicator.

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
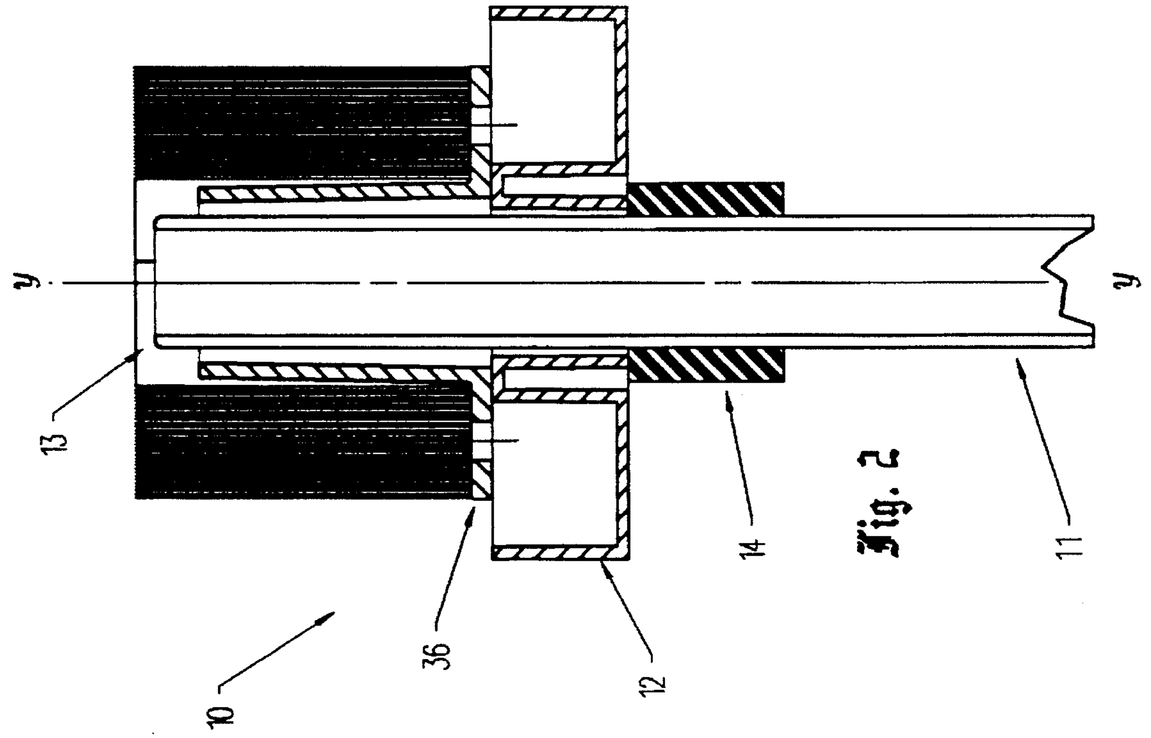
FIG. 2 is a view similar to FIG. 1, but showing the improved wallpaper applicator assembled.

Referring now to the drawings, and more particularly to FIGS. 1 and 2, applicator 10 is shown to broadly comprise shaft 11, cup-shaped member 12, spindle 13 and a resilient ring 14. Shaft 11 is a thin-walled cylinder member generated about axis y—y defined sequentially by outwardly-facing vertical cylindrical surface 15, upwardly-facing annular horizontal surface 16, and inwardly-facing vertical cylindrical surface 18.

Cup-shaped member 12 is a specially configured annular member generated about axis y—y and is sequentially defined by inwardly-facing vertical cylindrical surface 20, upwardly-facing annular horizontal surface 21, outwardly-facing vertical cylindrical surface 22, upwardly-facing annular horizontal surface 23, inwardly-facing vertical cylindrical surface 24, upwardly-facing annular horizontal surface 25, outwardly-facing vertical cylindrical surface 26, downwardly-facing annular horizontal surface 28, inwardly-facing vertical cylindrical surface 29, downwardly-facing annular horizontal surface 30, outwardly-facing vertical cylindrical surface 31 and a downwardly-facing annular horizontal surface 32. Surfaces 22, 23 and 24 define an annular reservoir 33 open at its top. Surface 20 defines an opening 34 large enough for shaft 11 to be passed through.

Spindle 13 is comprised of a thin-walled tubular portion 35 and a flange portion 36. Spindle 13 is generated about axis y—y and is defined sequentially by inwardly-facing vertical cylindrical surface 38, upwardly-facing annular horizontal surface 39, outwardly-facing vertical cylindrical surface 40, upwardly-facing annular horizontal surface 41, outwardly-facing vertical cylindrical surface 42, and downwardly-facing annular horizontal surface 43. A plurality of openings, severally indicated at 44, allow communication through flange portion 36. Surface 38 defines an opening 45 large enough for shaft 11 to be passed through. A slit 46 extends longitudinally along the entire length of tubular portion 35.

Resilient ring 14 is a cylinder generated about axis y—y and is sequentially defined by inwardly-facing vertical cylindrical surface 48, upwardly-facing annular horizontal surface 49, outwardly-facing vertical cylindrical surface 50, and downwardly-facing annular horizontal surface 51. Surface 48 defines an opening 52 which, when resilient ring 14 is unstressed, is smaller than shaft 11. Because resilient ring 14 is made of an elastomeric material, opening 52 can be enlarged to allow shaft 11 to be passed therethrough.

The applicator is assembled by first passing shaft 11 through opening 52 of resilient ring 14. Resilient ring 14 can be adjusted to any position along shaft 11. The elastomeric characteristics of resilient ring 14 exert a radially-inward force when arranged around shaft 11 to hold resilient ring 14 in position against shaft 11. Next, shaft 11 is passed through opening 34 of cup-shaped member 12. Because opening 34 is larger than shaft 11, cup-shaped member 12 is free to rotate about shaft 11. Resilient member 14 prevents cup-shaped member 12 from sliding down shaft 11.

As shown in FIG. 2, shaft 11 is passed next through the opening 45 of spindle 13. Flange surface 43 abuts annular surface 21 of cup-shaped member 12. Similar to opening 34 of cup-shaped member 12, opening 45 is larger than shaft 11, allowing free rotation of spindle 13 about shaft 11.

The applicator 10 is adapted to dispense wallpaper border roll 53. Preferably, roll 53 has an adhesive attached to its back surface, and the adhesive is activated by exposure to water forming, a paste. After soaking, roll 53 is wrapped around tubular portion 35 where it is supported by spindle flange portion 36. One end 54 of the roll is threaded through slit 46 and folded over, thus preventing end 54 of from releasing from tubular portion 35. As roll 53 rests on flange portion 36, excess water and paste flows through an opening 44 and collects in annular reservoir 33.

Applicator 10 can be adjusted for different-width wallpaper border rolls. To do this, resilient ring 14 is positioned higher or lower on shaft 11 so that the top of the wallpaper border roll does not extend beyond the top of shaft 11.

Once assembled and loaded with a roll, a person simply unwinds a length of wallpaper from the roll and applies this length to the desired location. If the border is being applied to high surface, applicator 10 must be supported at a height near the surface. The lower marginal end portion (not shown) of shaft 11 is internally threaded to receive a handle to lengthen applicator 10. Once the broom handle upper end is securely threaded into the applicator, its lower tip is set on the floor with applicator 10 propped against the subject surface near the point of the wallpaper application. Alternatively, applicator 10 can be held at the correct height by a second person. The roll 53 may be dispensed by either moving applicator 10 in the direction the wallpaper is to be applied.

As the end of roll is dispensed, end 54 would normally release from spindle 13. However, because end 54 is inserted through slot 46 and folded over, it is prohibited from releasing, thus preventing excess water and paste from escaping beyond reservoir 33.

Figure 3:
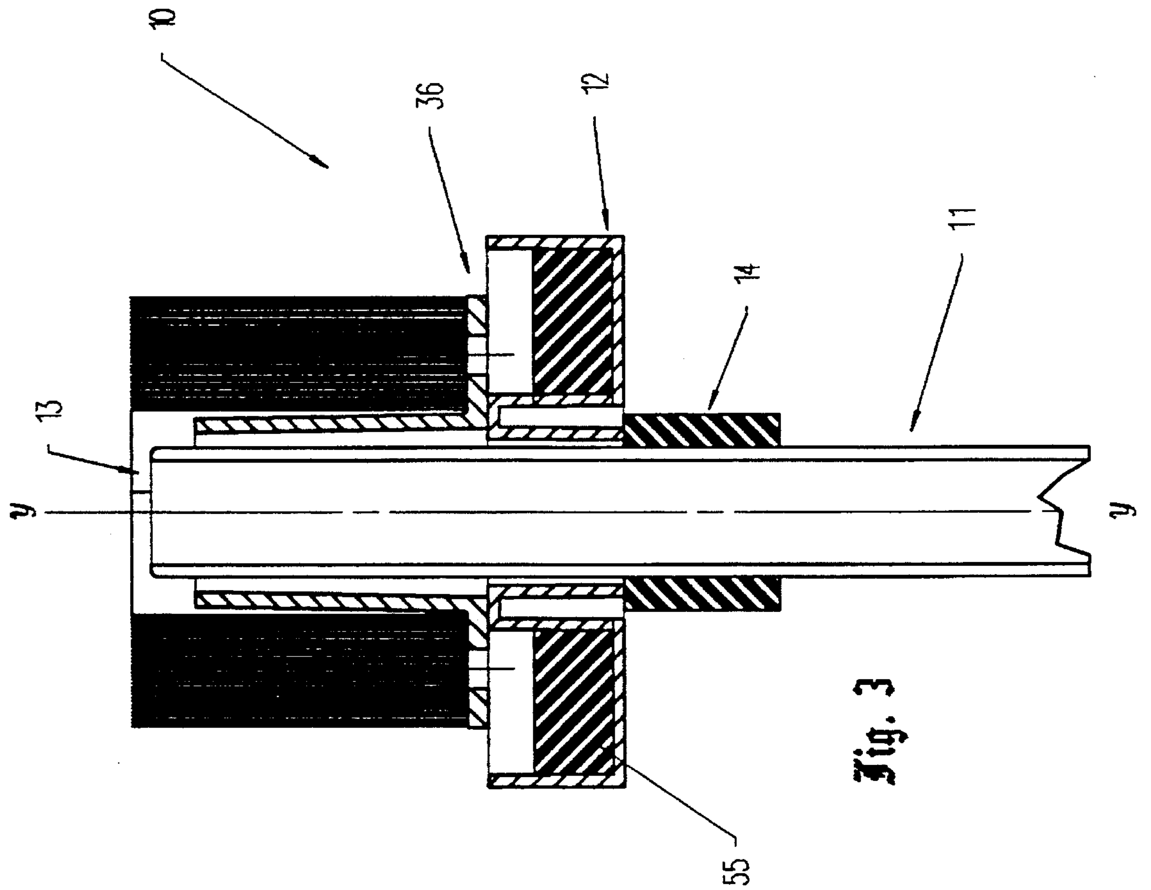
FIG. 3 is similar to FIG. 2 except an absorbent pad is positioned within the cup-shaped member.

Adverting to FIG. 3, another embodiment of the invention is shown as including an absorbent pad 55 positioned within cup-shaped member 12. Pad 55 is preferably made from a foam. Pad 55 slows the accumulation of excess water and paste at one portion of reservoir 33. If applicator 10 is not held vertically and pad 55 is absent, excess water and paste can accumulate at one side of reservoir 33, eventually overflowing. Pad 55 traps the water and paste as it drops into reservoir 33 and slows its migration.

Shaft 11, cup-shaped member 12 and spindle 13 are easily separable and preferably made of plastic, thereby facilitating their cleaning. Pad 55 is separable and can be cleaned as one would clean a sponge.

Modifications

The present invention expressly contemplates that various changes and modifications may be made. For example, the absorbent pad can be made from absorbent materials other than foam. In addition, a clip mechanism could be provided inside the tubular portion of the spindle adapted to securely hold the end of the wallpaper border to the tubular portion.

Furthermore, the applicator is not limited to dispense certain types of wallpaper. Wallpaper having paste applied after purchase, full size wallpaper rolls, and wallpaper of any material (e.g. paper, foil, vinyl and fabric) can be dispensed by the instant invention.

Therefore, while a preferred form of the improved wallpaper applicator assembly has been shown and described, and several modifications and changes thereof discussed, persons skilled in this art will readily appreciate that various additional changes and modifications may be made without departing from the spirit of the invention, as defined and differentiated in the following claims.

What is claimed is:

1. An applicator for rolled wallpaper, comprising:

an elongated shaft;

an annular cup-shaped member movably mounted on said shaft and functioning as a reservoir for excess fluid from said wallpaper;

a spindle journaled on said shaft, said spindle having a tubular portion surrounding said shaft and a flange portion extending outwardly therefrom, said tubular portion having a longitudinal slit; and abutment means positioned on said shaft preventing movement of said cup-shaped member along said shaft in one direction;

whereby said wallpaper is adapted to rest on said spindle flange wound about said tubular portion, and said wallpaper has an end placed through said slit to reduce slippage of said wallpaper while being dispened, and whereby excess fluid from said wallpaper collects in said cup-shaped member.

2. The applicator described in claim 1 wherein said cup-shaped member comprises a first longitudinally-extending cylinder through which said shaft extends, a first annular flange extending outwardly from the periphery of the upper edge of said first cylinder, a second longitudinally-extending cylinder extending downwardly from the outer periphery of said first flange, a second annular flange extending outwardly from the periphery of the lower edge of said second cylinder, and a third longitudinally-extending cylinder extending upwardly from the outer periphery of said second flange.

3. The applicator described in claim 1 wherein an absorbent pad is positioned in said cup-shaped member.

4. The applicator described in claim 3 wherein said absorbent pad is made of foam.

5. The applicator described in claim 1 wherein said cup-shaped member, said spindle and said shaft are made of plastic.

6. The applicator described in claim 1 wherein said shaft is a hollow cylinder and its lower end is threaded to receive an extension shaft.

7. The applicator described in claim 1 wherein said abutment means is an elastomeric band surrounding a portion of said shaft.

8. The applicator as set forth in claim 7 wherein said elastomeric band can be adjusted along said shaft.

9. The applicator as set forth in claim 1 wherein said flange portion has openings between its upper and lower surfaces.

* * * * *